United States Patent [19]

Yano et al.

[11] Patent Number: 4,976,854
[45] Date of Patent: Dec. 11, 1990

[54] OIL FILTER II

[75] Inventors: Hisashi Yano, Yokohama; Junsuke Yabumoto, Atsugi; Ryuzi Kuwavara, Yokohama, all of Japan

[73] Assignee: Mitsubishi Oil Co., Ltd., Tokyo, Japan

[21] Appl. No.: 420,048

[22] Filed: Oct. 11, 1989

[30] Foreign Application Priority Data

Apr. 25, 1989 [JP] Japan .................. 1-47649[U]

[51] Int. Cl.$^5$ .................................. B01D 19/00
[52] U.S. Cl. ............................ 210/168; 210/304; 210/307; 210/308; 210/440; 210/493.2; 210/497.01; 210/512.1; 210/DIG. 13; 210/DIG. 17; 55/191; 55/203; 184/6.24
[58] Field of Search ............... 210/168, 304, 307, 308, 210/433.1, 440, 444, 493.2, 497.01, 512.1, DIG. 13, DIG. 17; 55/191, 199, 203, 204; 184/6.24

[56] References Cited

U.S. PATENT DOCUMENTS

| | | | |
|---|---|---|---|
| 2,811,218 | 10/1957 | Winslow | 210/304 |
| 2,983,384 | 5/1961 | Winslow | 210/304 |
| 3,127,255 | 3/1964 | Winslow | 210/304 |
| 3,771,290 | 11/1973 | Stethem | 210/512.1 |
| 3,845,840 | 11/1974 | Thrasher | 55/276 |
| 3,898,068 | 8/1975 | McNeil | 55/337 |
| 4,707,165 | 11/1987 | Tauber et al. | 210/168 |
| 4,865,632 | 9/1989 | Yano et al. | 55/204 |
| 4,878,924 | 11/1989 | Yano et al. | 55/204 |

Primary Examiner—W. Gary Jones
Assistant Examiner—Matthew O. Savage
Attorney, Agent, or Firm—Barnes & Thornburg

[57] ABSTRACT

An oil filter comprising a housing opened at one end, a first separator unit in the housing for removing solid contaminants from the oil, a mount block for the housing and a second separator unit for removing gaseous contaminants. The first separator unit comprises a cylindrical filter element defining a central space therein, and the mount block is formed with a recess in which the second separator unit is disposed. The second separator unit includes a chamber arranged to generate a vortical flow in the oil introduced therein to thereby separate gas-rich oil which gathers in an axially central portion of the chamber, means for introducing the oil from the central space to the chamber, a first outlet member for leading the oil containing little gaseous contaminants and a second outlet member for discharging the gas-rich oil.

18 Claims, 2 Drawing Sheets

OIL FILTER II

BACKGROUND OF THE INVENTION

1. Field of the Invention

The present invention relates to an oil filter to be incorporated in a lubricating system for an internal combustion engine or the like and, more particularly, to an oil filter of a type in which not only solid contaminants but also gaseous contaminants can be removed from the oil.

2. Description of the Prior Art

In machinery for construction, transportation and the like using lubricant, such as engines and various hydraulic devices, solid contaminants and gaseous contaminants have hitherto been removed from lubricant by separate devices and/or in different portions of the machinery. A device has thus been desired which can remove both of the solid and gaseous contaminants effectively and which can be installed in a limited space of the machinery.

The inventors herein have proposed an integrated device in a pending Japanese Patent Application No. 202682/88 filed Aug. 16, 1988. The device disclosed therein comprises a first separator having a filter element for filtering lubricant which is pumped into a housing to thereby remove solid contaminants, and a second separator for removing gaseous contaminants from the filtered oil by utilizing a centrifugal force. Specifically, the second separator has a chamber adapted to generate a vertical flow of the lubricant introduced therein, whereby the lubricant having little gaseous contaminants and therefore having a larger specific gravity gathers in a peripheral area of the chamber while gas-rich lubricant having a smaller specific gravity gathers in a central area. A wall defining the chamber is provided with a plurality of pores through which the gas-removed lubricant flows out of the chamber. On the other hand, the gas-rich lubricant is discharged by a perforated pipe which extends into the chamber along its axis.

In the above proposed device, both the first and second separators are arranged within a housing which is to be attached to a mount block in a lubricating system. The mount block should in turn be provided with various passages to supply the lubricant into the housing, lead the filtered and gas-removed lubricant to various parts to be lubricated, and to discharge the gas-rich lubricant into a tank for recirculation, and attachment of the housing involves connecting these passages to respective portions of the housing. However, the above device is not so constructed that it may easily be attached to the mount, and relatively complicated work will be needed for the attachment. This is particularly important because, as is well known in the art, the filter element is subjected to replacement due to its clogging during a use of the device.

For a conventional type oil filter adapted to remove only the solid contaminants, it is an usual practice to replace the oil filter as a whole, i.e. including a housing. Although such a practice has been found desirable, application thereof to the above proposed device would be a waste of the second separator which can be used semi-permanently. Further, there are many replacement units of the conventional oil filter available in the market, but those units can not be used for the above proposed device.

SUMMARY OF THE INVENTION

Accordingly, an object of the invention is to provide an oil filter which can efficiently remove both solid and gaseous contaminants from the oil and which can easily be assembled and then incorporated in a lubricating system.

Another object of the invention is to provide an oil filter in which a filter element for removing solid contaminants can be replaced without complicated work and without a necessity of replacing an entire device.

A further object of the invention is to provide an oil filter which enables to use a replacement unit of usual type.

According to the present invention, these objects can be achieved by utilizing a mount block in a lubricating system. Thus, an oil filter of the invention comprises a housing opened at one end thereof, a first separator unit disposed in the housing for removing solid contaminants from the oil introduced into the housing, a mount block to which the housing is attached, and a second separator unit arranged in the mount block for removing gaseous contaminants from the oil that has passed through the first separator unit. The first separator unit includes a cylindrical filter element having an inner periphery and a central space defined within the inner periphery. Formed in the mount block is a recess in which the second separator unit is disposed, and an inlet passage for supplying the oil into the housing. The second separator unit includes a chamber adapted to generate a vertical flow of the oil introduced therein to thereby separate gas-rich oil which gathers in an axially central portion of the chamber, means for introducing the oil from the central opening of first separator unit to the chamber, a first outlet means for leading the oil containing little gaseous contaminants outside the mount block and a second outlet means for discharging the gas-rich oil outside the mount block.

In a preferred embodiment of the invention, the second separator unit further includes a cyclone secured in the recess to define the chamber and having a plurality of pores formed through the wall thereof. The first outlet means comprises the pores, the recess and a first outlet passage extending in the mount block and opening in the recess. The second outlet means may comprise a removal pipe extending into the chamber along the axis of cyclone and having formed in the wall thereof a plurality of orifices for permitting the gas-rich oil to flow thereinto, and a second outlet passage in the mount block to communicate with the removal pipe.

Other objects, features and advantages of the invention will be apparent from the following description of the preferred embodiments thereof when taken in conjunction with the accompanying drawings.

DESCRIPTION OF THE PREFERRED EMBODIMENTS

Figure 1:
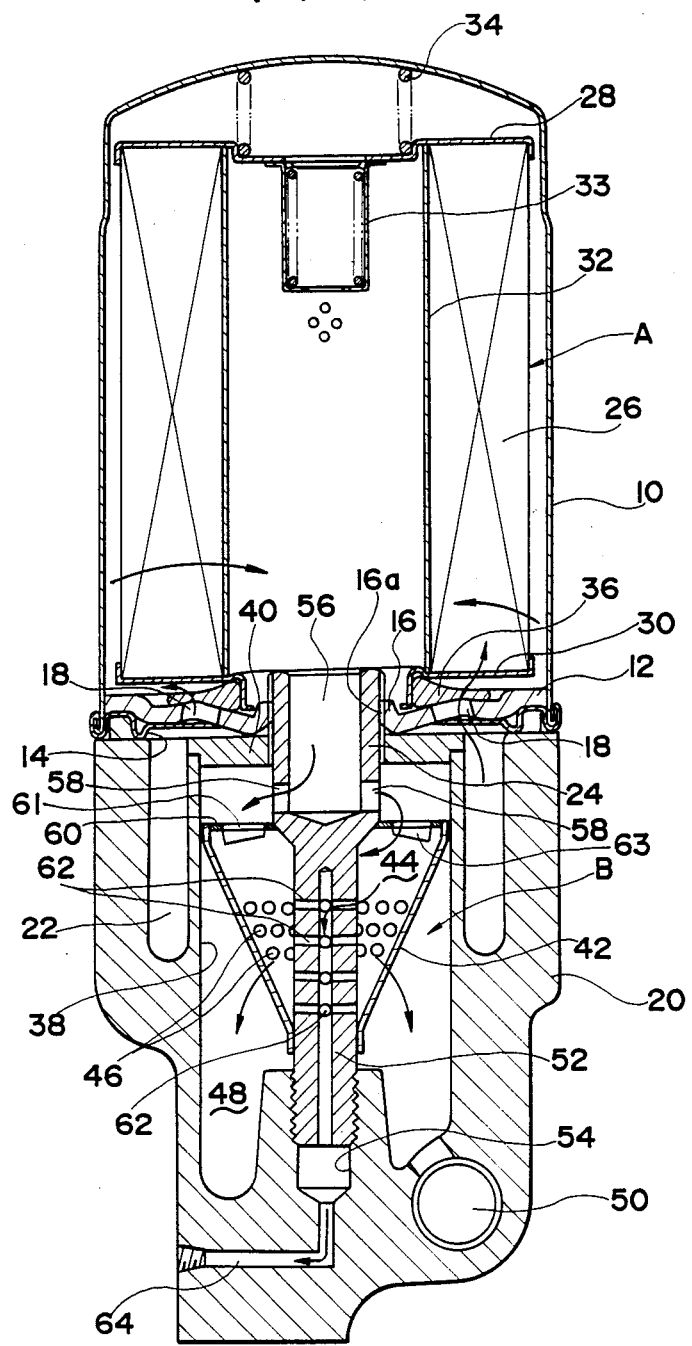
FIG. 1 is a longitudinally sectioned elevational view illustrating an oil filter according to an embodiment of the invention.

Referring first to FIG. 1 of the drawings, an oil filter according to a first embodiment of the invention has a housing 10 of substantially cylindrical shape having a lower open end and an upper closed end. A base plate or disk 12 is secured to an inner peripheral surface of the housing 10 at a position near its lower end and is fixedly supported by means of a ring member 14 of which outer edge is seamed with the lower edge of the housing 10. The base plate 12 is formed with a central opening defined by an upwardly projecting circular wall 16 which has a threaded inner surface 16a. An aperture 18 is provided in plate 12 radially outward of the opening, communicating with an inlet passage 22 formed in a mount block 20 to which the base plate 12 and therefore the housing 10 are attached. The mount block 20 is provided with a separately formed sleeve 24 which extends into the opening of the base plate 12 to threadedly engage with the inner surface 16a of circular wall 16. The ring member 14 is provided with a depression which is in tight contact with the upper surface of mount block 20 at a position radially outward the inlet passage 22 for preventing leakage of an oil.

Arranged within the housing 10 are a separator unit A for separating solid contaminants from the oil circulating in a lubricating system of a machine. The separator unit A is of usual type and comprises a filter element 26, an upper end plate 28 and a lower end plate 30 both fixed to the element 26. The filter element 26 has a hollow cylindrical shape and is typically formed of a pleated sheet. A perforated tube 32 is attached to the inner periphery of element 26 in order to prevent the element from collapsing while allowing the oil to flow into the central space within the unit A. The upper end plate 28 extends radially inward to support a relief valve 33 and a spring 34 which is compressed between the top wall of housing 10 and the upper end plate 28, thereby holding the unit A in position. The relief valve 33 is adapted to open and provide a bypass passage for the oil when a pressure of oil is increased outside the filter element 26 due to a clogging thereof, so that the oil can flow through the valve 33 into the space defined within the element 26. On the other hand, the lower end plate 30 extends slightly beyond the perforated plate 32 where it is bent downwardly to secure a check valve 36 that is adapted to prevent a reverse flow of the oil from the housing 10 into the inlet passage 22.

A second separation unit B is provided in the mount block 20 for removing gaseous contaminants from the oil that has passed through the first unit A. The second separator unit B includes a recess 38 which is formed in the center portion of mount block 20 and is closed by a cover plate 40 the upper surface of cover plate 40 being flush with the upper surface of mount block 20. The cover plate 40 has an opening through which the sleeve 24 extends into the housing 10. A funnel-shaped cyclone 42 is disposed in the recess 38 and is fixed at its upper edge to the wall defining the recess in a liquid-tight manner. The cyclone 42 defines in cooperation with a bottom plate 60 fixed thereto a chamber 44 adapted to generate a vortical flow of the oil introduced therein from inlets 61 formed in the bottom plate 60. The inlet 61 is formed by punch press with providing a guide wall or deflector 63 which extends in the circumferential direction of the bottom plate 60 so that the oil can flow into the chamber 44 with a vortical pattern. A plurality of pores 46 are formed through the wall of cyclone 42 to connect the chamber 44 with a space 48 which is defined between the cyclone 42 and the wall of recess 88 and communicates with a first outlet passage 50 extending in the mount block 20.

A removal pipe 52, which is an extension of the sleeve 24 with a reduced diameter, extends in the chamber 44 along its axial center to project downwardly through the lower open end of cyclone 42 that is closed by the pipe 52. The lower end of pipe 52 is threadedly fitted in a hole 54 formed in the mount block 20, thereby securing the base plate 12 to the block 20. The sleeve 24 has formed therein a vertical hole 56 opening into the space within the unit A and outlets 58 formed through the wall of sleeve at positions adjacent the lower end of vertical hole 56 and slightly above the upper edge of the cyclone 42. The upper portion of pipe 52 in the chamber 44 is formed with small orifices 62 through which a gas-rich oil flows into the pipe 52 as described later. The pipe 52 is connected via the blank space of hole 54 to a second outlet passage 64 which extends in the mount block 20 and is connected to, for example, an oil pan (not shown) for storing the oil. On the other hand, the first outlet passage 50 is connected to, for example, an engine (not shown) to be lubricated.

When the oil is supplied by a pump (not shown) via the inlet passage 22, it flows into the housing 10 through the aperture 18 and the check valve 36. The oil then passes through the filter element 26 from outside to inside during which solid contaminants are removed from the oil. The thus filtered oil flows in the space within the perforated plate 32 and is introduced into the chamber 44 via the vertical hole 56 and outlets 58, the deflector 60 inducing the vortical flow. The oil flows downward in the chamber 44 with the vortical pattern, generating a centrifugal force which acts on the oil. Due to a difference in density, the oil containing gaseous contaminants, i.e. gas-rich oil, is separated and gathers near the axial center of the flow where it is introduced through the orifices 62 into the removal pipe 52 for discharge into the oil pan via the second outlet passage 64. On the other hand, the remaining oil, which contains little gaseous contaminants, flows around the wall of cyclone 42 and passes through the pores 46 into the space 48 for circulation in the lubricating system via the first outlet passage 50.

In this way, solid and gaseous contaminants can efficiently be separated and removed from the oil. When it becomes necessary to replace the filter element 26 for removing solid contaminants with a new element due to clogging after a long use, the housing 10 is rotated relative to the mount block 20 whereby the circular wall 16 of base plate 12 is released from the engagement with the sleeve 24. Thus, the housing 10 together with the separation unit A can be detached from the mount block 20 which retains the separation unit B. Thereafter, only the filter element 26 on the assembly of the housing 10, element 26 and base plate 12 can be replaced. If the latter is desired, usual type oil filter, that is available in the market, may be used without modification.

Figure 2:
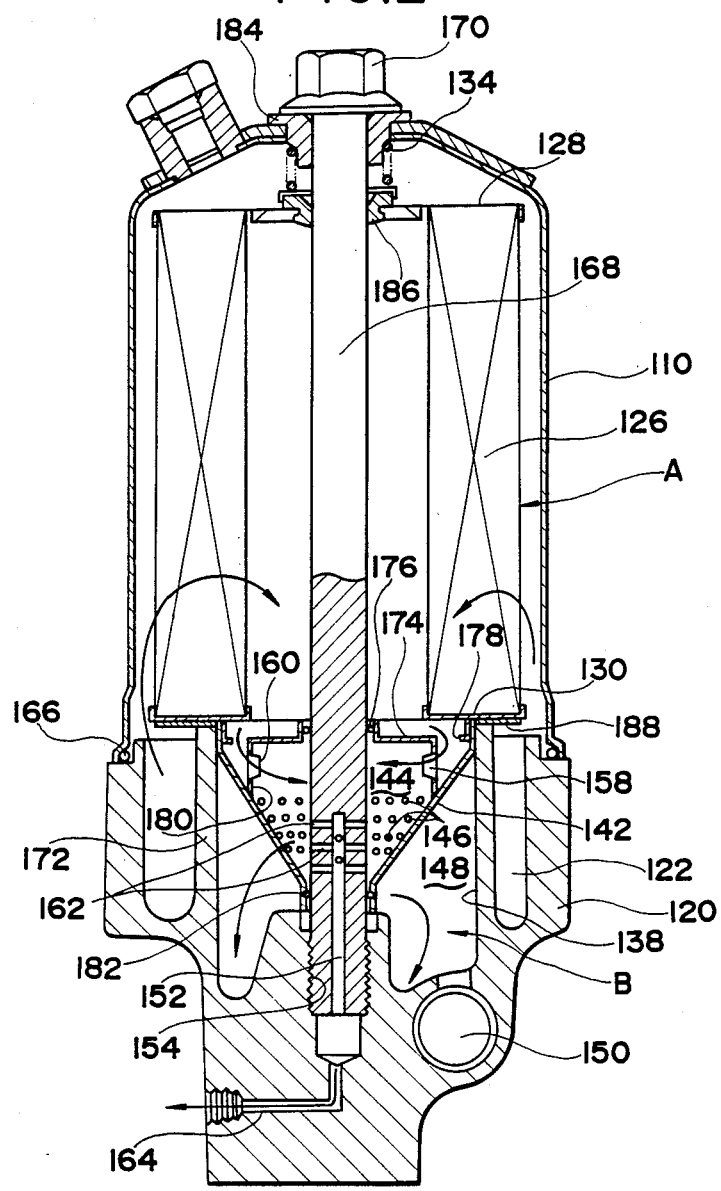
FIG. 2 is a view similar to FIG. 1 illustrating an oil filter according to another embodiment of the invention.

There has been known and available in the market an oil filter of a so-called center bolt type in which a attaching it to the mount block. One embodiment of the invention as applied to the oil filter of such a type is illustrated in FIG. 2 in which those parts same as or corresponding to the parts in FIG. 1 are designated by the same reference numeral but with an addition of "100".

A housing 110 accommodating the first separation unit A rests on the peripheral edge of upper surface of a mount block 120 with interposing a gasket in the form of an O-ring 166 therebetween. The housing 110 is attached to the block 120 by means of a center bolt 168 which extends along a center axis of the housing and is threadedly engaged at its lower end with a hole 154 in the block 120. The upper end of center bolt 168 fitted in a gasket 184 penetrates the top wall of the housing 110 to provide an enlarged head 170 for fastening or loosening the bolt 168.

As in the above embodiment, the unit A for separating solid contaminants comprises a filter element 126 and upper and lower end plates 128, 130. A gasket 186 is tightly fitted between the center bolt 168 and the upper end plate 128. Provided around the bolt 168 is a spring 134 which is compressed between the gaskets 184 and 186 for urging the unit A downwardly, whereby the lower end plate 130 abuts through a sealing member 188 against an end surface of a circular flange 172 to separate an inlet passage 122 from a recess 138. A funnel-shaped cyclone 142 is disposed within the recess 138 and fixed at its upper vertical edge to the inner surface of flange 172. The upper open end of cyclone 142 is closed by a dish-shaped cover member 174 which has a central opening for the center bolt 168 with an O-ring seal 176 fitted around the bolt and an aperture 178 formed through the bottom wall of cover member adjacent its outer end. Integrally provided with the cover member 174 is a circular wall 180 extending downwardly from the bottom wall adjacent the aperture 178 to the slant surface of cyclone 142, defining a chamber 144 within the cyclone 142. A plurality of inlets 158 are formed in the circular wall 180 and accompanied with deflectors 160 extending in a tangential direction of the wall 180 at the inlets 158, so that the oil flowing into the chamber 144 may generate a vortical pattern.

The center bolt 168 extends through the chamber 144 along its axis and is loosely fitted in the lower end portion of the cyclone 142 with interposing an O-ring seal 182 therebetween. A plurality of orifices 162 are formed in the center bolt 168 to connect the chamber 144 with a removal passage 152 which extends centrally in the lower portion of bolt 168 and opens into the blank space of hole 154.

The oil supplied into the housing 110 via the inlet passage 122 passes through the filter element 126 while separating solid contaminants, and is then introduced into the chamber 144 through the aperture 178 and the inlets 158. The vortical flow of the oil in the chamber 144 results in a separation of gas-rich oil which gathers around the center bolt 168 and is removed into the passage 152 via orifices 162. The gas-rich oil is finally discharged in an oil pan (not shown) through a second outlet passage 164 communicating with the passage 152. On the other hand, the oil containing little gaseous contaminants flows out of the cyclone 142 through pores 146 into a space 148 in the recess 138, and is led to a first outlet passage 150 connected to an engine. It will be understood that the housing 110 can be detached from the mount block 120 by disengaging the center bolt 168 from the hole 154.

Although the present invention has been described with reference to the preferred embodiments thereof, many modifications and alterations may be made within the spirits of the invention.

What is claimed is:

1. An oil filter comprising:
a housing opened at one end thereof;
a first separator unit disposed in said housing for removing solid contaminants from the oil introduced into said housing, said first separator unit including a cylindrical filter element having an inner periphery and a central space defined within the inner periphery;
a mount block to which said housing is attached, said mount block having formed therein a recess and an inlet passage for supplying the oil into said housing; and
a second separator unit disposed in said recess of said mount block for removing gaseous contaminants from the oil that has passed through said filter element, said second separator unit including a chamber having means for generating a vortical flow of the oil introduced therein to thereby separate gas-rich oil which gathers in an axially central portion of said chamber, means for introducing the oil from said central space of said first separator unit to said chamber, a first outlet means for leading the oil containing little gaseous contaminants outside said mount block and a second outlet means for discharging said gas-rich oil outside said mount block.

2. An oil filter as claimed in claim 1, wherein said first separator unit further comprises upper and lower end plates attached to the upper and lower ends of said filter element, respectively.

3. An oil filter as claimed in claim 1, wherein said second separator unit further includes a cyclone secured in said recess for defining said vortical flow generating means and having a plurality of pores formed through the wall thereof.

4. An oil filter as claimed in claim 2, wherein said cyclone is funnel-shaped.

5. An oil filter as claimed in claim 3, wherein said first outlet means comprises a plurality of pores formed in the wall of said cyclone, said recess and a first outlet passage extending in said mount block and opening in said recess.

6. An oil filter as claimed in claim 5, wherein said second outlet means comprises a removal pipe extending into said chamber along the axis of said cyclone and having formed in the wall thereof a plurality of orifices for permitting the gas-rich oil to flow thereinto, and a second outlet passage formed in said mount block to communicate with said removal pipe.

7. An oil filter as claimed in claim 6, further comprising a base plate fixed to said housing at the open end thereof and having a center opening, and a sleeve detachably secured to the surface of said base plate defining said center opening.

8. An oil filter as claimed in claim 7, wherein said removal pipe comprises an extension of said sleeve and includes a threaded lower end portion to engage with said mount block.

9. An oil filter as claimed in claim 7, wherein said oil introducing means of said second separator unit comprises a longitudinal hole in said sleeve opening in said central space and an outlet formed through the wall of said sleeve to open in said recess above said cyclone.

10. An oil filter as claimed in claim 9, wherein said second separator unit further includes a bottom plate attached to said cyclone for closing the same, and wherein said oil introducing means further comprises an inlet formed through said bottom plate.

11. An oil filter as claimed in claim 10, wherein said oil introducing means further includes a deflector adjacent said inlet and extending along the circumferential direction of said bottom plate.

12. An oil filter as claimed in claim 7, wherein said base plate has formed therein an aperture communicating with said inlet passage to allow the oil to flow into said housing.

13. An oil filter as claimed in claim 12, further comprising a cover plate closing said recess.

14. An oil filter as claimed in claim 5, further comprising a center bolt extending through said central space of said first separator unit and said recess to engage with said mount block, thereby securing said housing to said mount block.

15. An oil filter as claimed in claim 14, wherein said second outlet means comprises a removal passage formed in said center bolt, orifices formed in a portion of said center bolt extending in said cyclone to connect said chamber with said removal passage, and a second outlet passage extending in said mount block to communicate with said removal passage.

16. An oil filter as claimed in claim 15, further including a cover member attached to said cyclone for closing the same.

17. An oil filter as claimed in claim 16, wherein said oil introducing means of said second separator unit comprises an aperture formed in said cover member, a circular wall extending between said cover member and the wall of said cyclone and an inlet formed through said circular wall, whereby the oil flows into said chamber through said aperture and said inlet.

18. An oil filter as claimed in claim 17, wherein said oil introducing means further includes a deflector attached to said circular wall adjacent said inlet to extend substantially along a tangent of said circular wall at said inlet.

* * * * *

UNITED STATES PATENT AND TRADEMARK OFFICE
CERTIFICATE OF CORRECTION

PATENT NO. : 4,976,854

DATED : December 11, 1990

INVENTOR(S) : Hisashi Yano, Junsuke Yabumoto, and Ryuzi Kuwavara

It is certified that error appears in the above-identified patent and that said Letters Patent is hereby corrected as shown below:

In the Abstract, line 10; delete "in" and insert --of-- therefor.

In col. 1, line 31, delete "vertical" and insert --vortical-- therefor.
In col. 2, line 31, delete "vertical" and insert --vortical-- therefor.
In col. 3, line 9, after "in", please insert --the base--; line 67, delete "88" and insert --38-- therefor.
In col. 4, line 57, after "a" (second occurrence), insert --center bolt extends axially through the housing for--.

In col. 6, line 30 (claim 4, line 1), delete "claim 2" and insert --claim 3-- therefor.

Signed and Sealed this

First Day of December, 1992

*Attest:*

DOUGLAS B. COMER

*Attesting Officer*      *Acting Commissioner of Patents and Trademarks*